US006688910B1

(12) United States Patent
Macauley

(10) Patent No.: US 6,688,910 B1
(45) Date of Patent: *Feb. 10, 2004

(54) SYSTEM AND METHOD FOR AUTOMATIC ADDRESSING OF DEVICES IN A DEDICATED TELECOMMUNICATIONS SYSTEM

(75) Inventor: Daniel Warren Macauley, Fishers, IN (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/501,942

(22) Filed: Feb. 10, 2000

Related U.S. Application Data
(60) Provisional application No. 60/119,454, filed on Feb. 10, 1999.

(51) Int. Cl.[7] ................................. H01R 3/00
(52) U.S. Cl. .................. 439/491; 439/49; 439/490; 379/326
(58) Field of Search ................. 379/438, 326; 340/540, 815.45, 539; 439/490, 910

(56) References Cited

U.S. PATENT DOCUMENTS 6,222,908 B1 * 4/2001 Bartolutti et al. ............ 379/27
6,234,830 B1 * 5/2001 Ensz et al. ................... 439/491
6,350,148 B1 * 2/2002 Bartolutti et al. ........... 439/489
6,424,710 B1 * 7/2002 Bartolutti et al. ........... 379/326

* cited by examiner

Primary Examiner—Creighton Smith
(74) Attorney, Agent, or Firm—Synnestvedt Lechner & Woodbridge, LLP; Thomas J. Onka, Esq.; Paul Gardon, Esq.

(57) ABSTRACT

The present invention provides for automatic addressing of devices on a rack controller bus. As each tracing interface module in a rack is powered up, the device identifies its electronic serial number (ESN) to the rack controller via the rack controller bus. The ESN includes information identifying the type of module, and the number of ports on the module to the rack controller. The rack controller maps the module's ESN to a unique address, which it sends back to the module. In subsequent communications, the module uses this address to identify itself to the rack controller, and the rack controller uses this address to track the location of patch connections to the module. If a module is replaced, the rack controller tracks the replacement using the same address assigned to the original module. Another embodiment of the invention provides for automatic addressing of rack controllers in a cross-connect field wherein a hardware implementation allows each rack controller to automatically determine its relative position on the cross-connect LAN and address itself accordingly. As new rack controllers are added, each rack controller reassigns its address, tracking the relative position of the other rack controllers in the cross-connect field and, hence, maintaining the integrity of its database.

22 Claims, 6 Drawing Sheets

SYSTEM AND METHOD FOR AUTOMATIC ADDRESSING OF DEVICES IN A DEDICATED TELECOMMUNICATIONS SYSTEM

RELATED APPLICATIONS

This application relates to the Provisional Application Serial No. 60/119,454, entitled, SYSTEM AND METHOD FOR AUTOMATIC ADDRESSING OF DEVICES IN A DEDICATED TELECOMMUNICATIONS SYSTEM, filed on Feb. 10, 1999, which is assigned to the same assignee and is incorporated by reference herein. Applicant claims the benefit of the priority filing date of Feb. 10, 1999, pursuant to 35 U.S.C. §119.

This application also relates to the following co-pending applications, the disclosures of which are incorporated into this specification by reference.

U.S. patent application Ser. No. 09/247,614, entitled SYSTEM AND METHOD OF OPERATION FOR A TELECOMMUNICATIONS PATCH SYSTEM;

U.S. patent application Ser No. 09/247,269, entitled TRACING INTERFACE MODULE FOR PATCH CORDS IN A TELECOMMUNICATIONS PATCH SYSTEM;

U.S. patent application Ser. No. 09/247,385, entitled DISPLAY PANEL OVERLAY STRUCTURE AND METHOD FOR TRACING INTERFACE MODULES IN A TELECOMMUNICATIONS PATCH SYSTEM;

U.S. patent application Ser. No. 09/247,270, entitled METHOD AND DEVICE FOR DETECTING THE PRESENCE OF A PATCH CORD CONNECTOR IN A TELECOMMUNICATIONS PATCH SYSTEM;

U.S. patent application Ser. No. 09/247,237, entitled METHOD AND DEVICE FOR DETECTING THE PRESENCE OF A PATCH CORD CONNECTOR IN A TELECOMMUNICATIONS PATCH SYSTEM USING PASSIVE DETECTION SENSORS;

U.S. patent application Ser. No. 09/404,420, entitled METHOD AND DEVICE FOR IDENTIFYING A SPECIFIC PATCH CORD CONNECTOR AS IT IS INTRODUCED INTO, OR REMOVED FROM, A TELECOMMUNICATIONS PATCH SYSTEM;

U.S. patent application Ser. No. 09/???,???, entitled SYSTEM AND METHOD OF INTERCONNECTING TRACING INTERFACE MODULES TO A CENTRAL CONTROLLER IN A TELECOMMUNICATIONS PATCH SYSTEM;

U.S. patent application Ser. No. 09/404,619, entitled ILLUMINATED PATCH CORD CONNECTOR PORTS FOR USE IN A TELECOMMUNICATIONS PATCH CLOSET HAVING PATCH CLOSET HAVING PATCH CORD TRACING CAPABILITIES; and U.S. patent application Ser. No. 09/247,613, entitled SYSTEM AND METHOD FOR ADDRESSING AND TRACING PATCH CORDS IN A DEDICATED TELECOMMUNICATIONS SYSTEM.

BACKGROUND OF THE INVENTION

1. Field of the Invention

The present invention relates to the structure and method of operations of dedicated telecommunications patching systems where telecommunications lines are selectively coupled to one another in a telecommunications closet using patch cords. More particularly, the present invention relates to telecommunication patching systems that embody patch cord tracing capabilities that help a technician locate the opposite ends of a specific patch cord within the system.

2. Description of the Prior Art

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers are also terminated within the telecommunications closets.

A patching system is used to interconnect the various telecommunication lines within the telecommunications closet. In a telecommunications patching system, all of the telecommunication lines are terminated within the telecommunications closet in an organized manner. The organized terminations of the various lines are provided via the structure of the telecommunications closet. Within the telecommunications closet is typically located a mounting frame. On the mounting frame is connected a plurality of racks. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The port assemblies 14 each contain six RJ-45 telecommunication connector ports 16.

Each of the different telecommunication connector ports 16 is hard wired to one of the system's telecommunications lines. Accordingly, each telecommunications line is terminated on a patch panel 12 in an organized manner. In small patch systems, all telecommunications lines may terminate on the patch panels of the same rack. In larger patch systems, multiple racks are used, wherein different telecommunications lines terminate on different racks.

In the shown embodiment of FIG. 1, the interconnections between the various telecommunications lines are made using patch cords 20. Both ends of each patch cord 20 are terminated with connectors 22, such as an RJ-45 telecommunication connector or an RJ-11 telecommunications connector. One end of the patch cord 20 is connected to the connector port 16 of a first telecommunications line and the opposite end of the cord is connected to the connector port 16 of a second telecommunications line. By selectively connecting the various lines of the patch cords 20, any combination of telecommunications lines can be interconnected.

In many businesses, employees are assigned their own computer network access number so that the employee can interface with the company's main frame computer or computer network. When an employee changes office locations, it is not desirable to provide that employee with newly addressed telecommunication connection ports. Rather, to preserve consistency in communications, it is preferred that the exchanges of the telecommunication connection ports in the employee's old office be transferred to the telecommunications ports in the employee's new office. To accomplish this task, the patch cords in the telecommunication closet are rearranged so that the employee's old exchanges are now received in his/her new office.

As employees, move, change positions, add lines and subtract lines, the patch cords in a typical telecommunications closet are rearranged quite often. The interconnections of the various patch cords in a telecommunications closet are often logged in either paper or computer based log. However, technicians often neglect to update the log each and every time a change is made. Inevitably, the log is less than 100% accurate and a technician has no way of reading where each of the patch cords begins and ends. Accordingly, each time a technician needs to change a patch cord, that technician manually traces that patch cord between an internal line and an external line. To perform a manual trace, the technician locates one end of a patch cord. The technician then manually follows the patch cord until he/she finds the opposite end of that patch cord. Once the two ends of the patch cord are located, the patch cord can be positively identified.

It takes a significant amount of time for a technician to manually trace a particular patch cord. Furthermore, manual tracing is not completely accurate and technicians often accidentally go from one patch cord to another during a manual trace. Such errors result in misconnected telecommunication lines which must be later identified and corrected.

A need therefore exists in the field of telecommunication patching systems for a system that can trace and identify the ends of each patch cord in a telecommunications closet in an automated fashion, thereby reducing the labor and inaccuracy of manual tracing procedures. A need also exists for an automated system that enables the flexible substitution and/or addition of components in an automated system.

SUMMARY OF THE INVENTION

The present invention is used in connection with a patch cord tracing system for tracing patch cords in a telecommunications patching system. The system includes a plurality of tracing interface modules that attach to the patch panels in a telecommunications closet. On the patch panels in a telecommunications closet are located a plurality of connector ports that receive the terminated ends of patch cords. The tracing interface modules mount to the patch panels and provide a sensor, an LED and a tracing button to each of the connector ports. The sensor detects whenever a patch cord is connected to, or removed from, a connector port. Accordingly, by connecting a computer controller to the various sensors, the computer controller can monitor and log all changes to the patch cord interconnections in an automated fashion.

Additionally, by interconnecting the various LEDs, trace buttons and associated sensors to the same computer controller, the computer controller can initiate an automated trace of any patch cord upon the pressing of any trace button. Once a trace button associated with one end of a patch cord is pressed, the computer controller can locate the opposite end of that patch cord and can light the LED at the opposite end of that patch cord. This enables a technician to easily find the opposite end of a selected patch cord without having to manually trace the patch cord from end to end.

One embodiment of the present invention provides for automatic addressing of tracing interface modules on a computer controller bus. As each tracing interface module in a rack is powered up (or is substituted for a failed unit), the module identifies its electronic serial number (ESN) to the computer controller via the rack controller bus. The ESN includes information identifying the type of module, the number of ports on the module, and so forth to the computer controller. The computer controller maps the module's ESN to a unique, one- or two-byte address, which it sends back to the module. In subsequent communications, the module uses this address to identify itself to the computer controller. The computer controller, in turn, uses this address to track the location of patch connections to the module. If a module has to be replaced, the computer controller tracks the replacement module using the same address assigned to the original module.

Another embodiment of the present invention provides for automatic addressing of computer controllers in a cross-connect field (e.g. an interconnected plurality of telecommunications patching systems in a telecommunications closet). As each computer controller in a cross-connect field (networked via a cross-connect LAN) is powered up (or is substituted for a failed unit), it automatically announces its presence and broadcasts its electronic serial number (ESN) and address to the other computer controllers in the cross-connect field (typically the single wiring closet). A hardware implementation allows each computer controller to automatically determine its relative position on the cross-connect LAN and address itself accordingly. Each computer controller tracks patch connections between the tracing interface module on its rack and the tracing interface module on other racks using these sequential computer controller addresses. As new computer controllers are added to the cross-connect field, each computer controller dynamically reassigns its address, tracking the relative position of the other computer controllers in the cross-connect field and, hence, maintaining the integrity of its database.

BRIEF DESCRIPTION OF THE DRAWINGS

For a better understanding of the present invention, reference is made to the following description of and exemplary embodiment thereof, considered in conjunction with the accompanying drawings, in which.

DETAILED DESCRIPTION OF THE DRAWINGS

Figure 1:
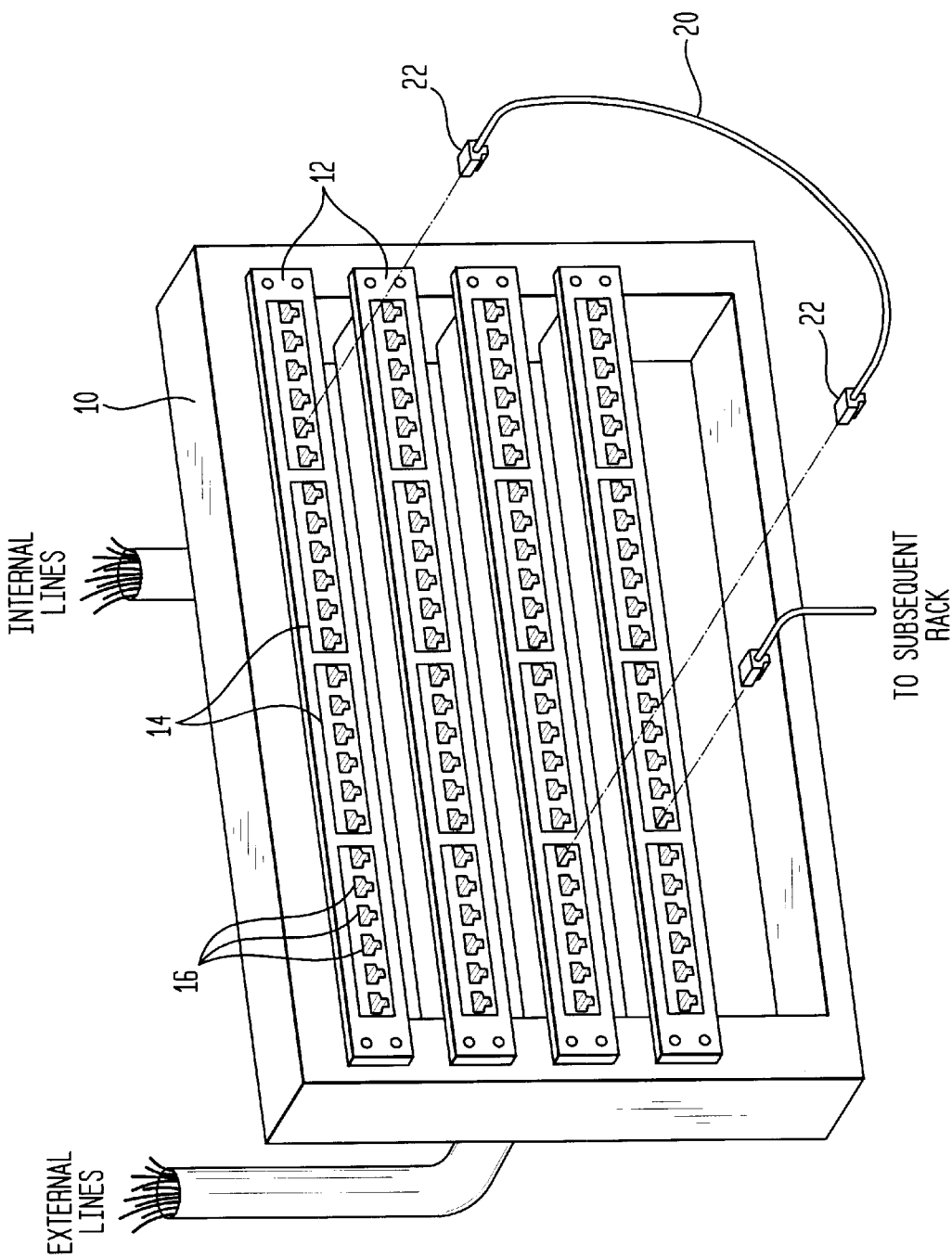
FIG. 1 is a perspective view of a typical prior art telecomunications rack assembly containing multiple patch panels with connector ports that are selectively interconnected by patch cords.
Figure 2:
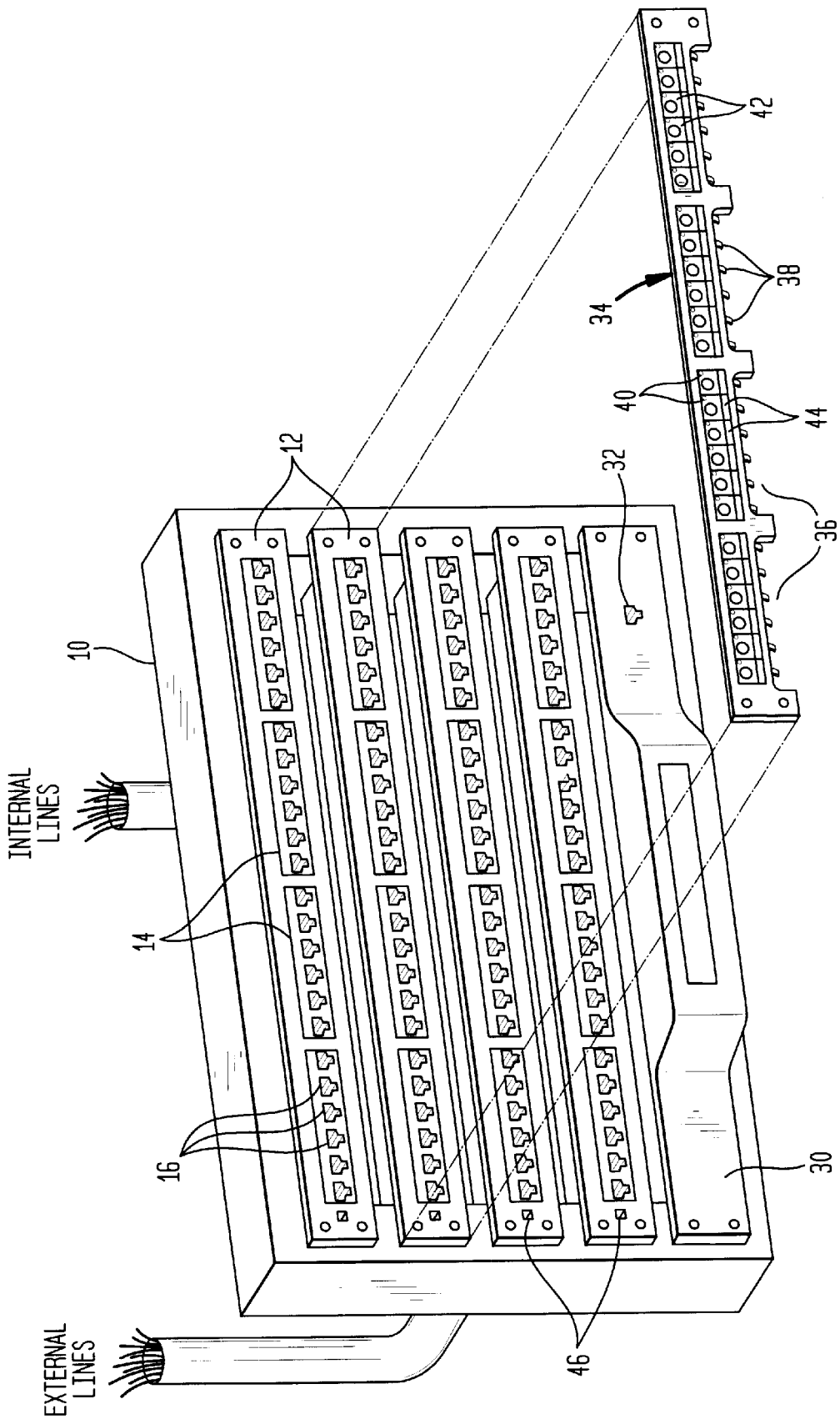
FIG. 2 is a perspective view of a tracing interface module and rack controller, shown in conjunction with the prior art telecommunications rack assembly of FIG. 1.

Referring to FIG. 2, a conventional telecommunications rack 10 is shown, such as the one previously described in regard to FIG. 1. The telecommunications rack 10 contains a plurality of patch panels 12 that are mounted in parallel horizontal rows within the rack 10. Each of the patch panels 12 contain a plurality of port assemblies 14. The connector ports 16 associated with each of the port assemblies 14 are hard wired to the incoming external lines or the incoming internal lines.

In the present invention system, a rack controller 30 is mounted to each rack 10 in the overall patch system. The rack controller 30 contains a central processing unit (CPU). If multiple racks are present within the telecommunications closet, the rack controllers on different racks are interconnected with one another so that they can communicate in a common network as if they were a single controller. The CPU is capable of independently running line tracing programs and also contains a remote access port 32 that enables the CPU to be accessed by a remote computer. Remote access of the rack controller is the subject of related co-pending patent application Ser. No. 09/247,614, entitled System And Method Of Operation For A Telecommunications Patch System, which has already been incorporated into this application by reference.

The purpose of the rack controller 30 is to operate and gather data from the various tracing interface modules 34, as will be later explained. The tracing interface modules 34 are modules that mount to the face of each patch panel 12 on the rack 10. The tracing interface modules 34 surround the various connector ports 16 located on patch panels 12 and provide an interface through which data about each connector port 16 can be transmitted to and from the rack controller 30.

The tracing interface module 34 can have multiple different configurations. The structure and different configurations of the tracing modules are disclosed in related co-pending patent application Ser. No. 09/247,269, entitled Tracing Interface Module For Patch Cords In A Telecommunications Patch System; patent application Ser. No. 09/247,385, entitled Display Panel Overlay Structure And Method For Tracing Interface Modules In A Telecommunications System; and patent application Ser. No. 09/247,270, entitled Method And Device For Detecting The Presence Of A Patch Cord Connector In A Telecommunications Patch System. These applications have already been incorporated into this application by reference.

Figure 3:
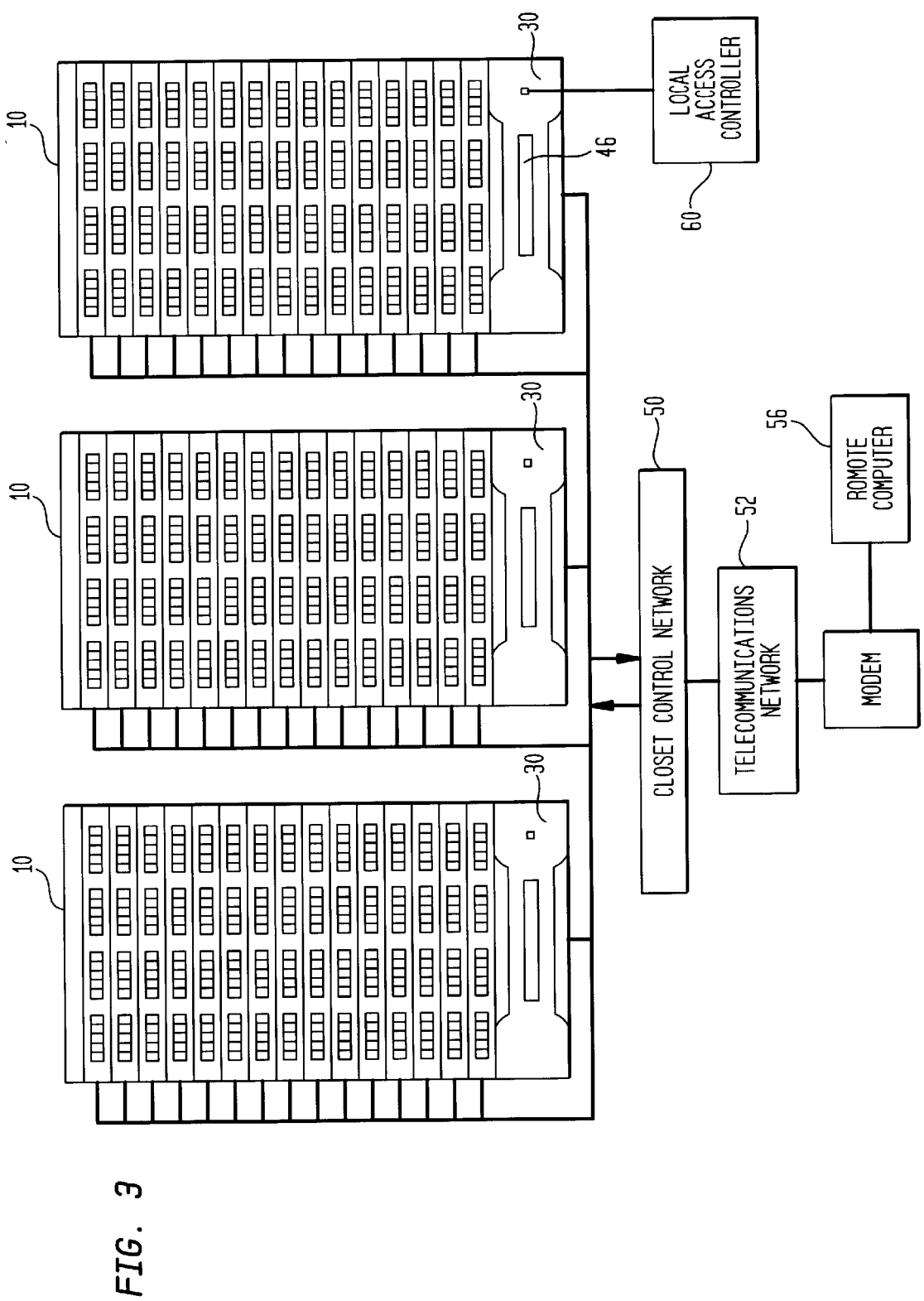
FIG. 3 is an enlarged, fragmented, view of a section of a tracing interface module attached to a prior art patch panel.

In the shown embodiment, the tracing interface module 34 contains a rectangular relief 36 that surrounds the connector ports 16 on each port assembly 14 when the tracing interface module 34 is connected to the patch panels 12. Referring to FIG. 2, in conjunction with FIG. 3, it can be seen that extending into each rectangular relief 36 is a plurality of sensors 38. Each sensor 38 corresponds in position with one of the connector ports 16 on the patch panel 12. As the terminated end of a patch cord 20 (FIG. 1) is connected to a connector port 16, the presence of the patch cord is detected by the rack controller 30. It should be understood that the use of such sensor is merely exemplary and passive optical-based or electrical based sensors can be used. The use of alternate embodiments of sensors is described in co-pending U.S. patent application Ser. No. 09/247,270, entitled Method And Device For Detecting The Presence Of A Patch Cord Connector In A Telecommunications Patch System; U.S. patent application Ser. No. 09/247,237, entitled Method And Device For Detecting The Presence Of A Patch Cord Connector In A Telecommunications Patch System Using Passive Detection Sensors; and U.S. patent application Ser. No. 09/404,420, entitled Method And Device For Identifying A Specific Patch Cord Connector As It Is Introduced Into, Or Removed From, A Telecommunications Patch System. These co-pending applications have been incorporated into this disclosure by reference. The rack controller 30 is capable of automatically determining when a patch cord has been added or removed from any connector port 16 on the rack 10. By recording the sequential insertions of a first and then a second end of the patch cord into respective ports, the rack controller is able to detect the ports connected by the patch cord. Alternatively, by coding each end of the patch cord with a unique code recognizable by the sensors 38, the rack controller is able to positively identify the ports connected by a given patch cord without reliance on insertion sequence.

In addition to the sensors 38, the tracing interface module 34 also contains light emitting diodes (LEDs) 40 and tracing buttons 42. An LED 40 and tracing button 42 are provided for each connector port 16 when the tracing interface module 34 is connected to the patch panel 12. Accordingly, once the tracing interface module 34 is in place, each connector port 16 on the patch panel 12 has an LED 40 and tracing button 42 that corresponds in position to that connector port 16.

Indicia may be printed on each of the tracing buttons 42 to help identify the different tracing buttons 42. Additionally, a labeling area 44 is provided below each tracing button 42 for further identification. Each labeling area 44 can be written upon to identify the port in a manner useful to the system's technician.

Referring back to FIG. 2, it can be seen that a small aperture 46 is formed through each patch panel 12 at one end. The tracing interface module 34 contains a connector (not shown) that extends through that aperture 46 when the tracing interface module 34 is connected to the rack 10. A flexible connector cable (not shown) is used to interconnect each tracing interface module 34 to the rack controller 30, utilizing the space behind the patch panels 12. Accordingly, the rack controller 30 is directly connected to all the LEDs 40, trace buttons 42 and sensors 38 on all of the trace interface modules 34. An alternative method of interconnecting the tracing interface modules 34 to the rack controller 30, without requiring an aperture in the patch panels is shown in co-pending patent application Ser. No. 09/???, ???, entitled System And Method Of Interconnecting Tracing Interface Modules To A Central Controller In A Telecommunications Patch System.

Figure 4:
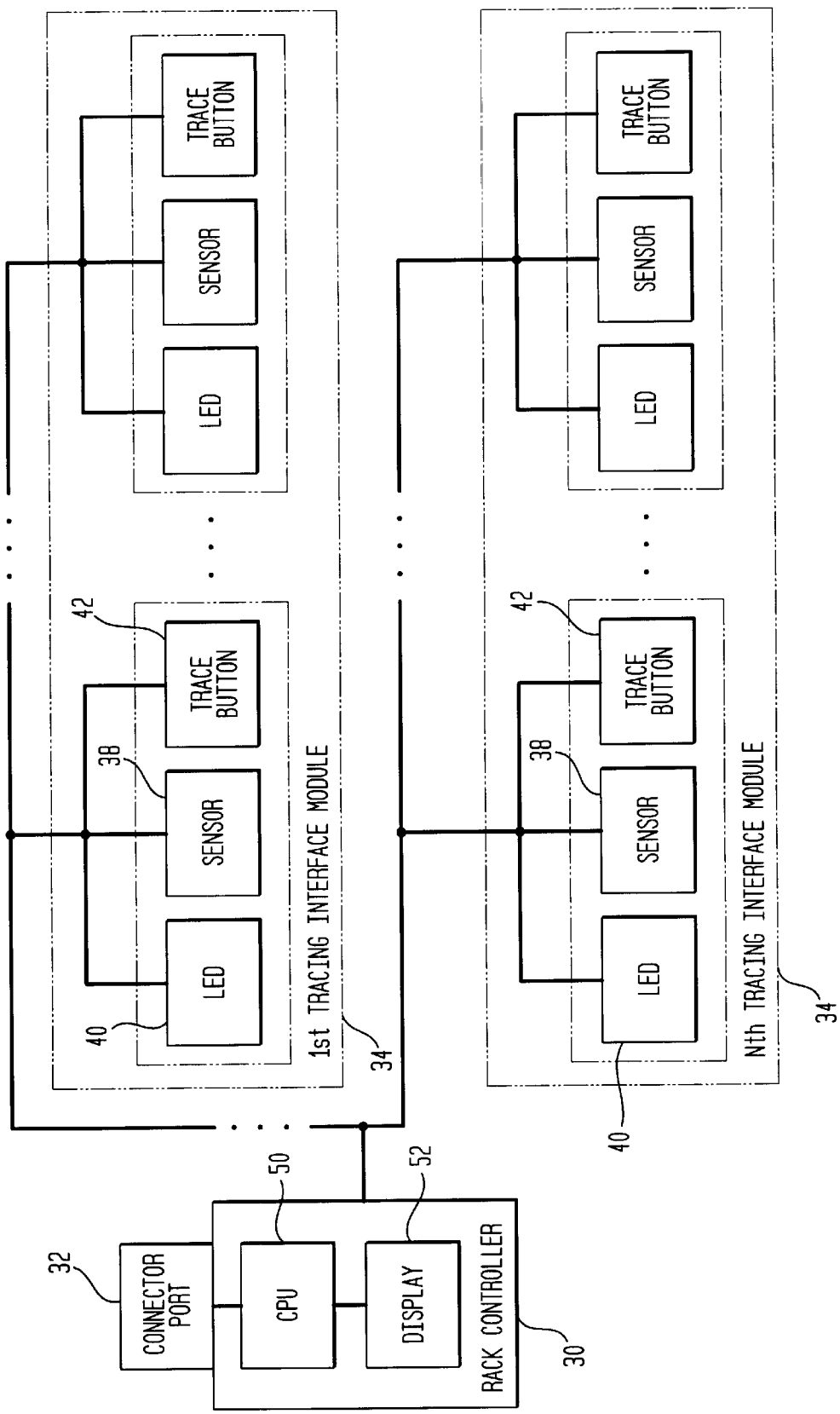
FIG. 4 is a schematic view of an automated tracing system.

Referring to FIG. 4, a schematic of the overall system is shown. From FIG. 4, it can be seen that the rack controller 30 contains a CPU 50, a display 52 and a remote access connector port 32. The rack controller 30 is wired to each of the tracing interface modules 34, wherein the rack controller 30 communicates with all of the LEDs 40, trace buttons 42 and sensors 38 that are on each of the tracing interface modules 34.

When a patch cord 20 (FIG. 1) is placed into any connector port 16 (FIG. 2), or removed from any connector port, that change is sensed by a sensor 38 and is read to the CPU 50 in the rack controller 30. The CPU 50 in the rack controller 30 is therefore capable of monitoring any and all changes that occur with respect to the patch cords in the patch system over time. The CPU 50 is therefore also capable of automatically keeping an accurate log of all changes that have occurred with respect to the patch cords since the installation of the present invention system. Accordingly, if a technician is servicing the patch system, that technician can read the accurate log straight from the CPU 50. The log can be read out on the display 52 of the rack controller 30 or can be remotely accessed via the connector port 32 on the rack controller 30.

In addition to keeping an accurate log of all physical patch cord changes, the present invention system can also be used to accurately trace the end points of any patch cord 20 (FIG. 1). For instance, suppose a technician wants to find the opposite end of a particular patch cord. That technician can press the trace button 38 that corresponds in position to the known end of the patch cord. Upon the pressing of the trace button 38, the CPU 50 will review its own log and will determine where the opposite end of that patch cord is located. The CPU 50 will then light the LED 40 that corresponds in position to the opposite end of the targeted patch cord. The technician then need only look for the lit LED 40 on one of the tracing interface modules 34 to find the opposite end of the targeted patch cord. The wasted time and inaccuracy of manually tracing patch cords are eliminated.

In addition to lighting the LEDs 40 to show the ends of the various patch cords, the rack controller 30 may also display instructions or useful information on its display 52 with the use of, for example, alpha numeric characters. For example, the location of a patch cord by rack number and patch panel may be displayed. Alternatively, the identity of the patch cord may be displayed, thereby helping a technician verify that he/she is servicing the correct patch cord.

Since the present invention system contains a rack controller 30, that can be mounted to an existing telecommunications rack, and tracing interface modules 34, that can be mounted to existing patch panels, it should be clear that the present invention tracing system can be retroactively added to many different types of telecommunication patch systems. The rack controller is sized to mount in existing racks. The tracing interface modules are designed with very thin profiles. Accordingly, when added to existing patch systems, the components of the present invention do not require any physical changes to the layout of the telecommunications closet or the position of the patch panels on the racks within that closet.

Figure 5A:
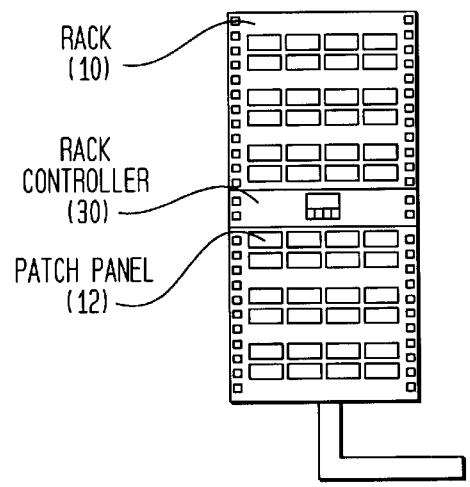
FIGS. 5A and 5B illustrate the automatic addressing of devices on a rack manager bus in accordance with the present invention.
Figure 5B:
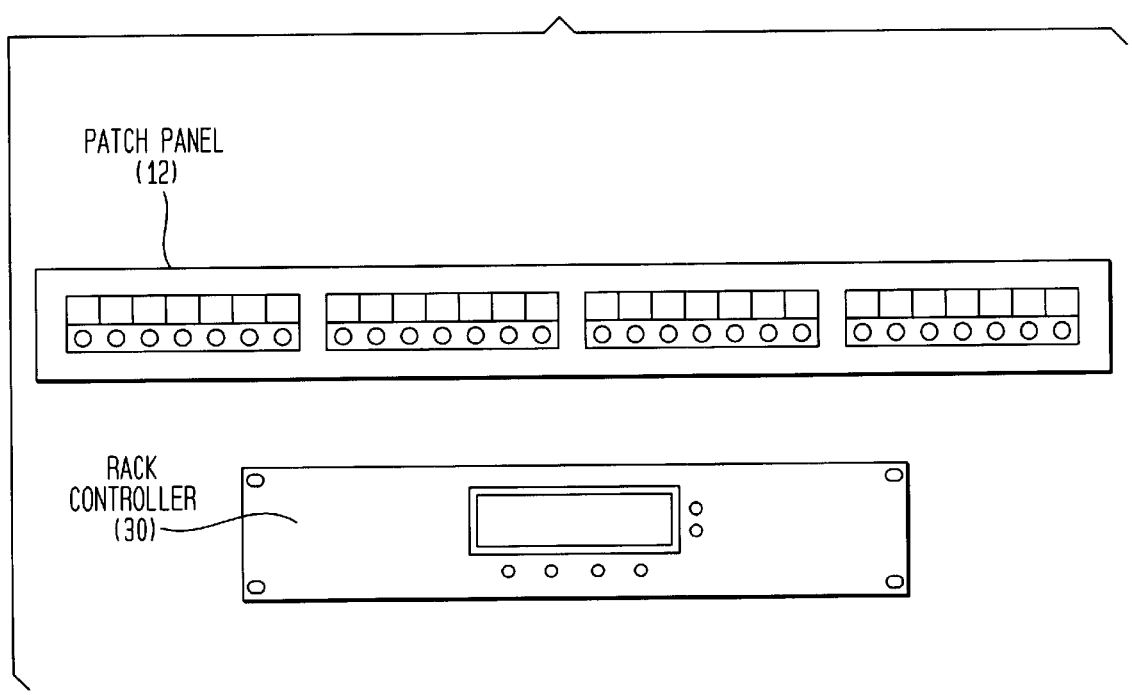
Figure 6A:
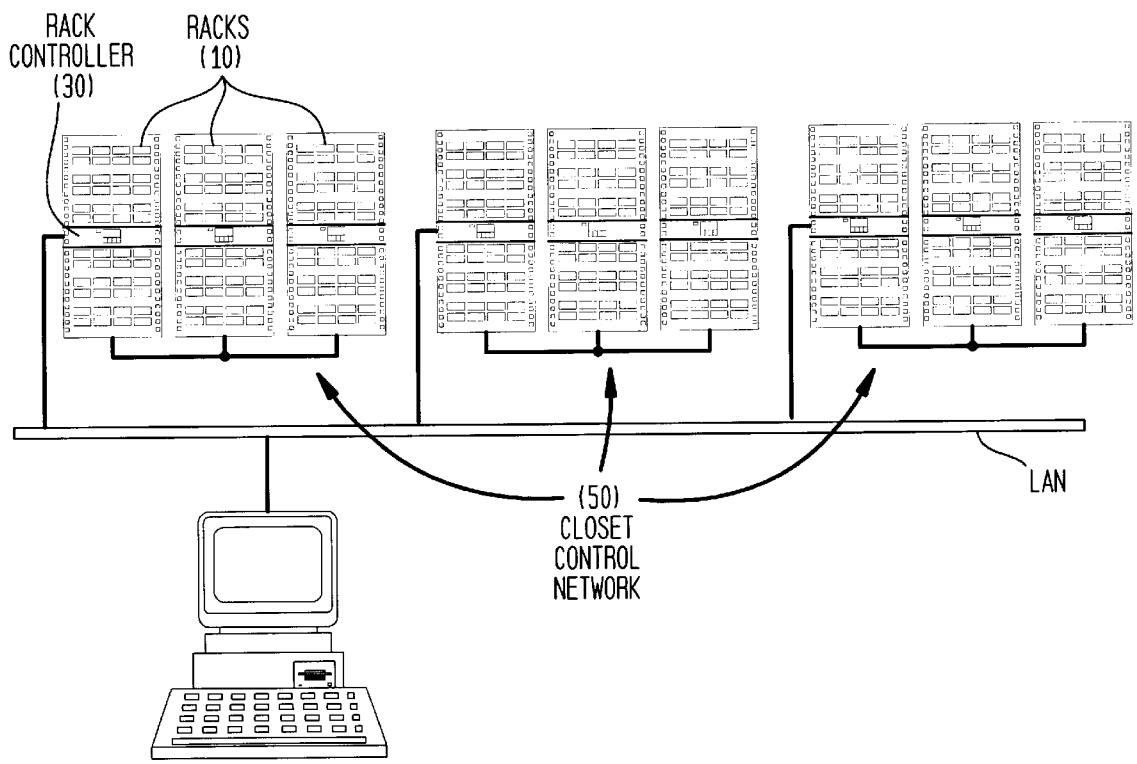
FIGS. 6A and 6B illustrate the automatic addressing of rack managers in a cross cornect field in accordance with the present invention.
Figure 6B:
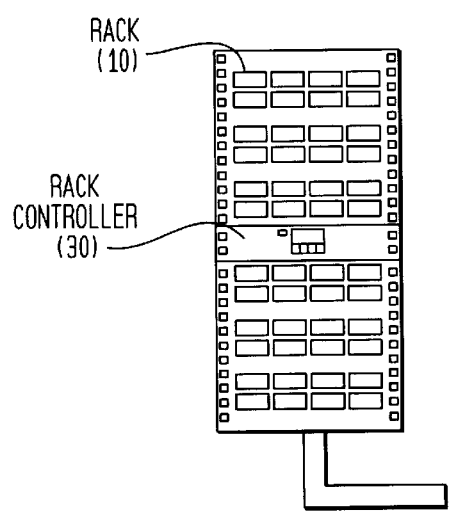

One embodiment of the present invention provides for automatic addressing of devices on a rack controller bus (FIG. 5). As each tracing interface module in a rack—such as the InfoMax Panel—is powered up (or is substituted for a failed unit), the module identifies its electronic serial number (ESN) to the rack controller via the rack controller bus. The ESN includes information identifying the type of module, the number of ports on the module, and so forth to the rack controller. The rack controller maps the module's ESN to a unique, one- or two-byte address, which it sends back to the module. In subsequent communications, the module uses this address to identify itself to the rack controller. The rack controller, in turn, uses this address to track the location of patch connections to the module. If a module has to be replaced, the rack controller tracks the replacement module using the same address assigned to the original module.

This approach to addressing modules in a rack provides several efficiencies. First, technician time is saved and database integrity is protected since the technician does not have to manually identify modules to the rack controller. Second, communications are more efficient since a one- or two-byte address is used to identify modules rather than lengthier ESNs. Third, the rack controller (via its display) can guide the technician through the process of reconnecting patchcords when a smart module has been replaced, speeding this process.

Another embodiment of the present invention provides for automatic addressing of rack controllers in a cross-connect field. As each rack controller in a cross-connect field (networked via a cross-connect LAN) is powered up (or is substituted for a failed unit), it automatically announces its presence and broadcasts its electronic serial number (ESN) and address to the other rack controllers in the cross-connect field (typically the single wiring closet). A hardware implementation allows each rack controller to automatically determine its relative position on the cross-connect LAN and address itself accordingly. Each rack controller tracks patch connections between the interfacing track modules on its rack and the interfacing track modules on other racks using these sequential rack controller addresses. As new rack controllers are added to the cross-connect field, each rack controller dynamically reassigns its address, tracking the relative position of the other rack controllers in the cross-connect field and, hence, maintaining the integrity of its database.

The use of shorter addresses, rather than lengthier ESNs to identify rack controllers in a cross-connect field speeds communications between rack controllers. The fact that rack controllers can automatically address themselves eliminates the need for technicians to track and manually input addresses. Furthermore, this approach to identifying rack controllers preserves the integrity of each rack controller's database when a new rack controller is added to the cross-connect field or an existing rack controller is replaced.

It will be understood that the embodiment of the present invention specifically shown and described is merely exemplary and that a person skilled in the art can make alternate embodiments using different configurations and functionally equivalent components. For example, there can be many different tracing interface module configurations that can be used in accordance with the present invention, other than the exemplary layout shown. All such alternate embodiments are intended to be included in the scope of this invention as set forth in the following claims.

What is claimed:

1. A system for automatic addressing of devices in a telecommunications rack assembly, the system comprising:
    a patch panel including a plurality of connector ports;
    a tracing interface module juxtaposed with said patch panel, said tracing interface module including a plurality of sensors, wherein ones of said sensors are established in a cooperative relationship with ones of said connector ports for detection of a connection at a port;
    a plurality of light emitting diodes (LEDs) on said tracing interface module, ones thereof corresponding to ones of said plurality of sensors;
    a plurality of tracing buttons, ones thereof corresponding to ones of said plurality of sensors;
    a rack controler including a central processing unit (CPU) and a display;
    wherein said tracing interface module and said rack controller are electrically interconnected.

2. The system of claim 1 wherein a plurality of patch panels are mounted in said rack assembly.

3. The system of claim 1 wherein an aperture is located on an edge of said patch panel for connecting said patch panel to said telecommunications rack.

4. The system of claim 1 wherein said CPU is operative to cause a connection status at ones of said connector ports to be indicated on said display.

5. The system of claim 1 further including tracing indicia printed on ones of said tracing buttons.

6. The system of claim 1 wherein each said tracing button has a labeling area provided below said button for further identification.

7. The system of claim 1 wherein said rack controller can be mounted to an existing telecommunications rack, and said tracing interface modules can be mounted to existing patch panels such that said tracing system can be retroactively added to telecommunication patch panels.

8. The system of claim 1 wherein upon power-up of a tracing interface module:

said module identifies its electronic serial number (ESN) to the rack controller via a rack controller bus;

said rack controller maps said module's ESN to a unique address;

said rack controller sends address back to said module;

said module uses said address to identify itself to said rack controller; and said rack controller uses said address to track the location of patch connections to said module.

9. The system of claim 8 wherein said unique module address is no more than two bytes in length.

10. The system of claim 8 wherein upon said module being replaced, said rack controller tracks the replacement module using said address assigned to said original module.

11. The system of claim 1 further including a plurality of telecommunication rack assemblies connected in a cross-connect field, each said rack assembly including at least one tracing interface module and at least one rack controller, wherein upon power-up of a rack controller:

said rack controller announces its presence and broadcasts its electronic serial number (ESN) to other rack controllers in the cross connect field; and each said rack controller tracks patch connections between tracing interface modules on other racks using said rack controller addresses.

12. The system of claim 11 wherein upon a new rack controller being added, each rack controller then dynamically reassigns its address, and tracks the relative position of the other rack controllers in the cross connect field.

13. The system of claim 1 wherein said CPU is operable to line tracing programs.

14. The system of claim 1 wherein said CPU contains an access port that enables the CPU to be accessed by a remote computer.

15. The system of claim 1 wherein said rack controller manages and gathers data from the various tracing interface modules.

16. The system of claim 1 wherein upon a patch cord being placed into said connector, said sensor senses the connection of said patch cord, and said sensed connection is read to said CPU in said rack controller.

17. The system of claim 1 wherein said patch cord is removed and said sensor senses the disconnection of said patch cord, and is read to said CPU in said rack controller.

18. The system of claim 1 wherein said CPU maintains a log of all changes that have occurred with respect to the installation of patch cords into said connector ports.

19. The system of claim 1 wherein the endpoints of said patch cord can be traced by pressing said trace button that corresponds in position to a known end of the patch cord, and said CPU will review its log and determine where an opposite end of said patch cord is located and cause said LED to light on said tracing interface module where the opposite end of said patch cord is located.

20. The system of claim 19 wherein said location of said patch cord is displayed on said display.

21. The system of claim 1 wherein a connector extends through said aperture on said patch panel.

22. The system of claim 1 wherein a remote access connector port is attached to said rack controller.

* * * * *